Sept. 4, 1951 H. J. McCREARY 2,567,115

ELECTRONIC DIRECTOR

Filed Aug. 20, 1949 2 Sheets-Sheet 1

INVENTOR.
HAROLD J. McCREARY

BY *Chas. W. Candy*

ATTORNEY

Sept. 4, 1951 H. J. McCREARY 2,567,115

ELECTRONIC DIRECTOR

Filed Aug. 20, 1949 2 Sheets-Sheet 2

INVENTOR.
HAROLD J. McCREARY

BY Chas. W. Candy

ATTORNEY

Patented Sept. 4, 1951 2,567,115

UNITED STATES PATENT OFFICE 2,567,115

ELECTRONIC DIRECTOR

Harold J. McCreary, Lombard, Ill., assignor to Automatic Electric Laboratories, Inc., Chicago, Ill., a corporation of Delaware Application August 20, 1949, Serial No. 111,520

23 Claims. (Cl. 179—18)

The present invention relates in general to telephone exchange systems and more particularly to an electronic director system in which digit values to be transmitted are registered as corresponding charges on condensers.

The principal object is to provide a novel electronic director which offers considerable economic advantage and also offers an arrangement for operation which is greatly simplified.

Another object of the present invention is to provide a system in which the first six digits or any part thereof are set up by the first two digits dialed and the coded cross wiring of the director, and in which the remaining digits of the dialed number are re-transmitted without translation.

Other objects of the invention will appear upon a further perusal of the specification taken in conjunction with the accompanying drawings which illustrate an embodiment of the invention in the form of the schematic circuit diagram.

Figure 1:
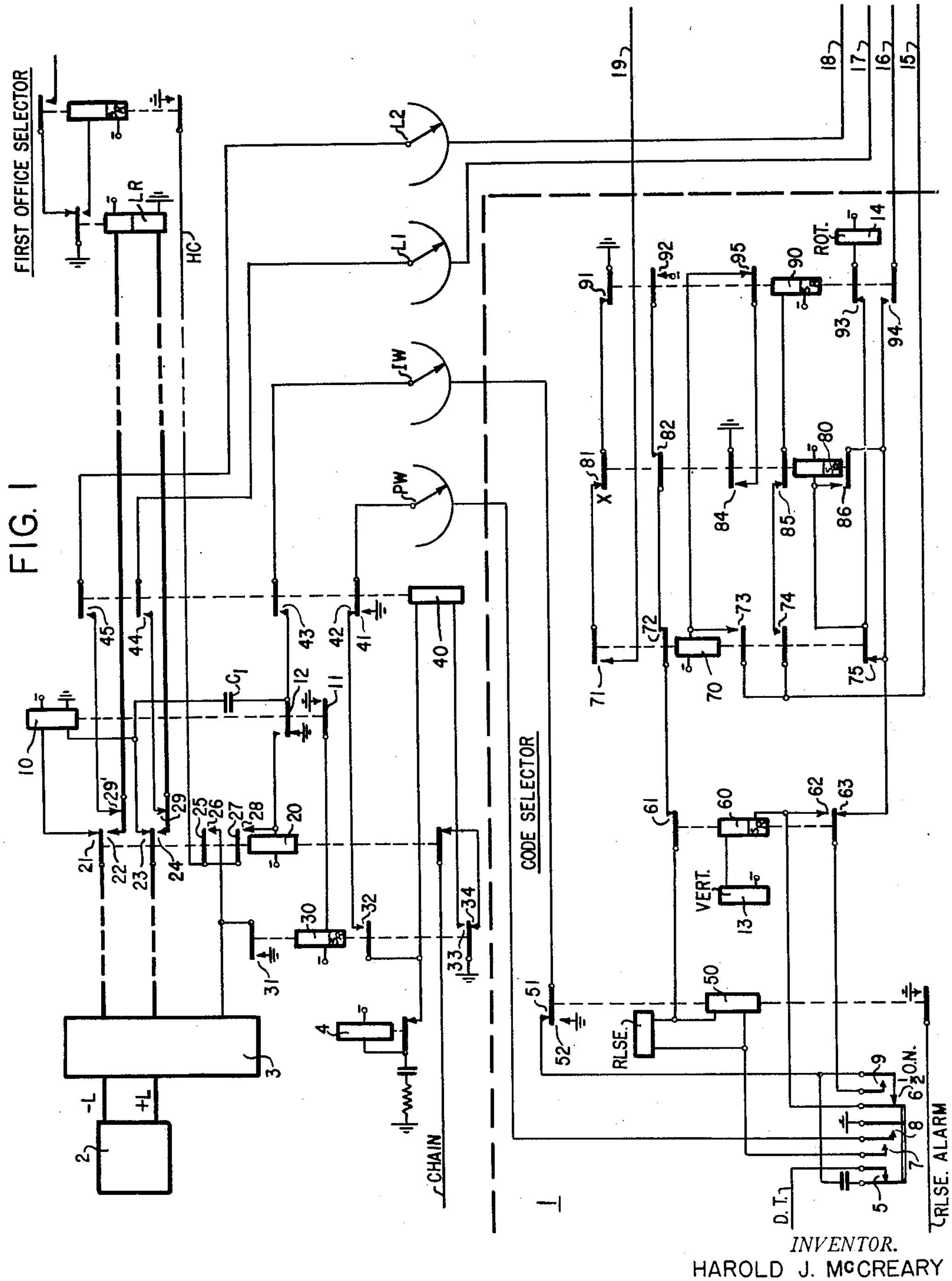
Figure 2:
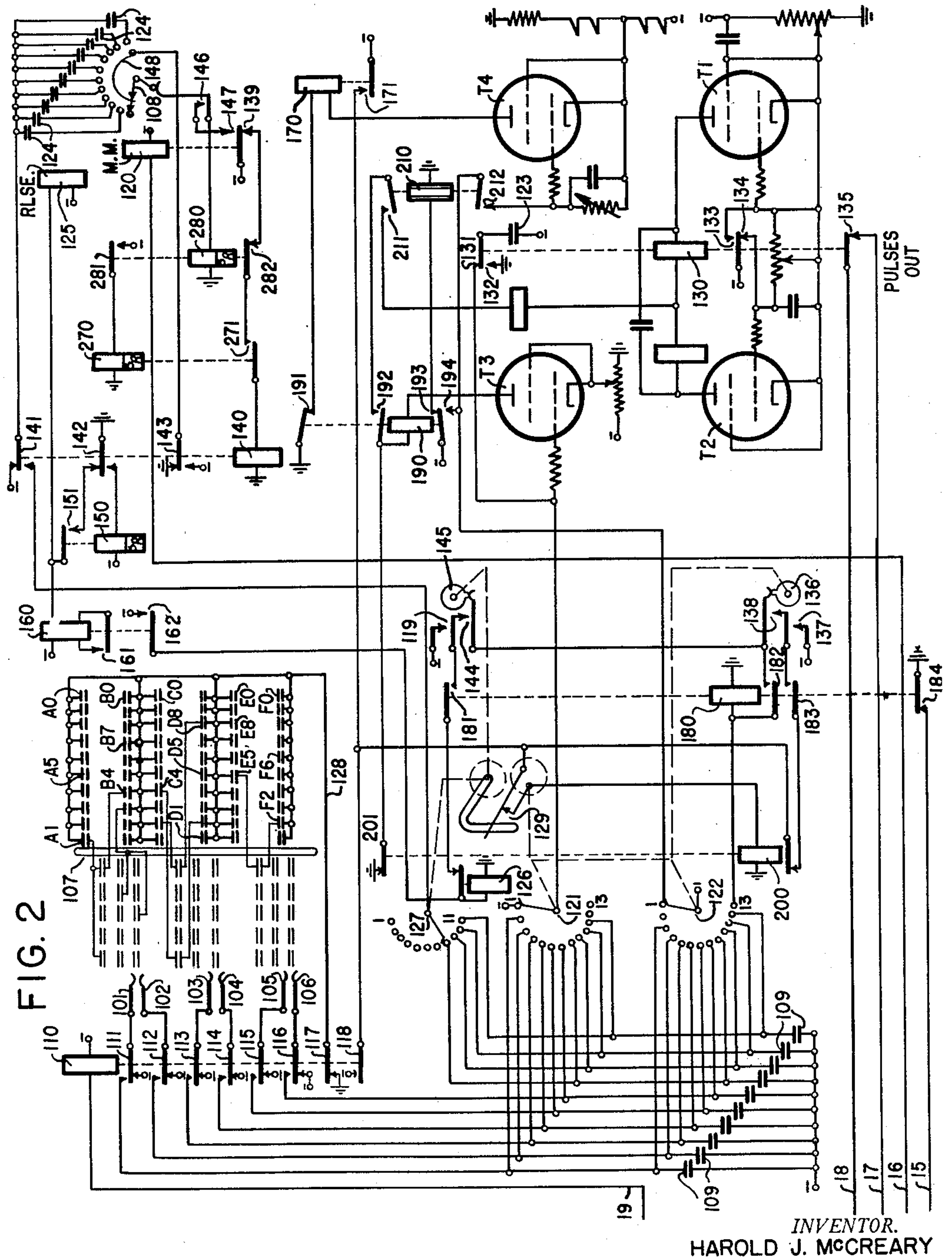

The invention will be better understood from the detailed description of one method of carrying it into effect which follows, reference being had to the accompanying drawings, Figs. 1 and 2, which show by way of example, the invention adapted for use in a system using as many as 100 office exchanges. The first two dialed incoming digits will be translated into any number of digits less than seven and the values of the digits received being translated according to code wiring. The digits are stored instantly and as soon as the second incoming digit is received, the sender starts sending the coded digits at once. The next four incoming digits are stored without translation in sequence as received. When the first six coded digits have been sent, the sender will start sending the remaining digits as fast as standard practice will permit or until it has caught up with the digits being received. When the sender catches up with the dialing, it will hesitate until the incoming digit is received and then send it. When the last digit has been sent, the director release relay is operated and remains operated until both rotary switches are returned to their home positions. In order to facilitate the understanding of the invention, Fig. 2 should be placed to right of Fig. 1 with the corresponding lines in alignment.

In the upper left hand corner of Fig. 1, as shown by a block diagram, is a telephone substation designated 2, which is well-known in the telephone art. Connected thereto is the line switch designated 3, which is also well-known in the art. Connected to the line switch 3 is a director selector unit which comprises the relays

10, 20, 30 and 40; the wipers PW, IW, L1, L2, and the motor magnet 4. The director selector unit is of the general type described in detail in the book "Telephony" written by Dr. Arthur Bessey Smith commencing on page 325 and shown in Fig. 228 of the same book. In the upper right hand corner of Fig. 1 is shown the line and release relays of the first office selector which is a well-known Strowger vertical and rotary switch. In the lower portion of Fig. 1 is shown the code selector designated 1. The code selector 1 may be of the well-known Strowger type vertical and rotary switches.

In the upper left hand corner of Fig. 2 is shown the brushes 101—106, which are part of the code selector 1, and are used to mark the code on a bank of condensers. A rotary switch, comprising wipers 121 and 122, is shown in the lower left hand corner of Fig. 2, and is of the general type disclosed in Patent No. 1,675,311, granted June 26, 1928, to Hans Sengebusch, in which the wipers advance one step upon each deenergization of the rotary magnet 200. A rotary switch comprising wiper 127, shown directly above wiper 121, may be of the general type disclosed in Patent No. 1,675,311, granted June 26, 1928, to Hans Sengebusch, in which the wiper advances one step upon each deenergization of the rotary magnet 126. The electronic circuit shown in the lower right hand corner of Fig. 2 is substantially the same as the electronic circuit of Patent No. 2,463,708, issued on March 8, 1948, to the present inventor. The minor switch 108 is of the type well-known in the art and steps its wipers upon deenergization of the motor magnet 120.

Briefly described, the first two digits dialed will be received by the code selector 1 in the form of pulses. In so doing, the first set of pulses raises the six brushes 101-106, respectively, of the code selector 1 to the corresponding bank levels. The second set of pulses rotates the brushes 101-106, respectively to the desired terminal on the bank level selected.

The first two digits dialed will be translated into any number of digits less than seven. The value of the digits being set up according to a code wiring designated 107. The digits are stored as charges into the selected condensers of the group of condensers designated A1—A0, B1—B0, C1—C0, D1—D0, E1—E0 and F1—F0, and the arrangement of these condensers will be described subsequently. After the first two digits are dialed to the selector 1, the remaining digits dialed pulse the minor switch 108. The six brushes 101-106, respectively, of the code selector 1 are accessible to three 200 bank contacts. The bank contacts referred to are those well-known in the art. Each brush, however, is only accessible to 100 bank contacts. Code wiring 107 connects the bank contact directly to the sixty condensers of the six groups of condensers A1—A0, B1—B0, C1—C0, D1—D0, E1—E0 and F1—F0. However, connections will be extended through the code wiring 107 so that each brush will only be accessible to a particular group of ten condensers. For example, brush 101 will only be accessible to condensers A1—A0; brush 102 will only be accessible to condensers B1—B0, etc. Further, each 100 bank contacts will be connected by code wiring 107 to a designated group of condensers depending upon the code selected. Several bank contacts of the above-mentioned 100 bank contacts can be connected to a particular condenser of the above-mentioned designated group in accordance with the code selected. In the instances where a code selected is less than six digits, the bank contacts selected by the brushes will only be accessible to the same number of different condensers as there are digits in the code. The remaining bank contacts will be blank. Each bank contact will be connected to a designated condenser only when six digit codes are used. The arrangement was selected to prevent one condenser used in a particular code to be repeatedly used in the same code, when a digit value of the code is repeated. Each group of condensers comprises ten condensers, and each condenser in the group will have a different capacitance so as to represent different digits. However, condensers A1, B1, C1, etc., will have equal capacitance. Therefore, when a digit value is repeated in the same code, the repeated digit value is represented by a different condenser of equal capacitance as had represented the first of the repeated digit values. The condensers selected become charged as the brushes engage the bank contacts. A further series of condensers designated 109 are called register condensers, and each of these condensers has equal capacitance.

Code relay designated 110 receives a pulse from the code selector 1 after the first two digits have been dialed. The operation of the code relay 110 discharges the selected condensers into the first six of the ten register condensers 109. In this manner storing a charge in the register condensers 109 for sending the first six coded digits. The operation of code relay 110 also completes the circuit which energizes and operates the stepping magnet 200 of the wipers 121 and 122 in preparation for taking the first step. The succeeding steps for the wipers 121 and 122 are made when tube T4 fires. The wiper 121 is provided for successively connecting the register condensers 109 to an impulse counting circuit.

The impulse counting circuit comprises a gaseous discharge tube designated T3, which is biased to a point below its critical grid potential by the charge on the register condensers 109, and an auxiliary condenser 123 controlled by an impulse generator comprising tubes T1 and T2. The impulse generator is arranged to operate relay 130 when tubes T1 and T2 fire to charge the auxiliary condenser 123 during the break period of the contacts and to connect the auxiliary condenser 123 in multiple with register condenser 109 during the break period of contacts 132. The auxiliary condenser 123 discharges and charges in the reverse direction whereby a definite increment of the charge is abstracted from the register condenser 109 each time relay 130 operates to transmit impulses at contact 135. The impulse generator, comprising tubes T1 and T2, is arranged to concurrently transmit impulses by means of relay 130 to an output circuit to automatic telephone switches or the like.

When a number of impulses corresponding to the initial charge on the register condenser 109 have been transmitted, the charge on the register condenser 109 will have been reduced to a point where the gaseous tube T4 associated with the impulse counting circuit is enabled to fire, and thereby stops further transmission of impulses over the control circuit for predetermined time intervals after which the rotary switch wipers 121 and 122 are advanced to the next register condenser and the second series of pulses are counted. This sending will continue until the sender catches up with the storage of digits. The impulse generator comprises gaseous tubes T1, T2 and relay 130. Gaseous discharge tube T3 controls the number of impulses transmitted in series, and gaseous tube T4 controls the spacing interval between successive series of pulses.

The minor switch motor magnet 120 receives its pulse for stepping after the first two digits have been dialed. Each pulse steps the minor switch 108 so as to connect one of the condensers 124, and each of the condensers 124 has a different capacitance to correspond to a digit. The relay 140 when energized completes the path for discharging the electrical charge from the selected condenser of condensers 124 into the seventh and succeeding register condensers 109. Relay 150 completes the path to energize release magnet 125 to release the minor switch 108 after each completion of the series of pulses. Relay 160 completes the path for the operation of magnet 126 of the rotary switch 127. Wiper 127 steps to the next terminal after the completion of each series of pulses. As soon as the release magnet 125 is operated, the minor switch 108 is prepared to receive the next series of pulses representing the succeeding digit. This operation continues for the remaining three digits. During the storing of the last four digits, the first six coded digits may be sent out. Wiper 121 again successively connects the register condenser 109 to the impulse counting circuits. The operation of the impulse counting circuit is the same as previously described. When the last digit has been sent out the director release relay 108 is operated and switches are returned to their home positions.

The invention will now be described in detail with reference to the drawings, Figs. 1 and 2. At the outset, the subscriber at substation 2 raises his handset and the substation is immediately connected to the lineswitch 3 in a manner well-known in the art. Upon completion of the connection to the lineswitch 3 a circuit is completed for the operation of line relay 10 in the following manner: battery, relay 10, contact 21, lineswitch 3, one side of the line to substation 2, through substation 2, the other side of the line of substation 2, lineswitch 3, contact 23 and ground on relay 10. Relay 10 operates and the armature 11 closes the operating circuit to relay 30. Relay 30, a slugged relay, is operated in the following manner: battery, relay 30, armature 11, and ground. In operating relay 30, contact 31 grounds the release trunk to hold the lineswitch; contact 34 breaks to remove the chain connection, and contact 33 makes to connect the test circuit of the director selector by connecting motor magnet 4 and switching relay 40 in series with each other and battery.

The private wiper PW is resting on a trunk extending to a code selector. If the trunk is busy, the switching relay 40 is short circuited by the ground on PW, and the motor magnet 4 drives the wiper to the next contact. Relay 40 is in series with motor magnet 4 in the following manner: ground, contact 33, relay 40, magnet 4 and battery. A ground on PW shorts relay 40 in the following manner: ground, contact 33, contacts 32 and 42 and ground on PW. Ground on PW energizes motor magnet 4 over the following path: battery, motor magnet 4, contacts 32 and 42 and ground on PW. Magnet 4 at its interrupter contact interrupts its own circuit to deenergize. Deenergization of motor magnet 4 steps the wipers PW, IW, L1 and L2 to the next consecutive bank contact. This operation continues until PW finds an absence of ground. With absence of ground on PW, relay 40 operates over the following path: ground, contact 33, relay 40, interrupter contacts, magnet 4 and battery. Relay 40, since it is a high resistance relay and in series with motor magnet 4 when operated will prevent the operation of motor magnet 4. Relay 40 remains operated as long as relay 30 remains operated, since contact 33 puts a ground connection on relay 40.

When relay 40 operates, contact 41 makes and puts ground on PW to busy out the director; and contact 42 breaks to open the circuit to motor magnet 4. Dial tone is sent back to the calling party's line when contact 43 makes over the following path: dial tone terminal DT, O. N. contact 5, tone condenser, contact 51, IW, contact 43, C1, contact 23 and lower talking conductor to substation 2. Relay 20 is not operated during this period, since there is no operating circuit until the release relay 50 operates.

The system is now prepared for dialing. The subscriber dials at substation 2 and pulses are sent out in accordance to the digits dialed. The pulses emitted interrupt relay 10 over the substation circuit.

Relay 10 pulses the vertical magnet 13 to cause the brushes 101—106 to take the first step over the following path: ground, armature 12, contact 43, wiper IW, contact 51, O. N. contact 6, relay 60, vertical magnet 13 and battery. Slow-to-release relay 60 is energized when the vertical magnet 13 is pulsed over the described path. The brushes 101—106 of code selector 1 take the first step. In so doing, O. N. contacts 5 and 6 break, and O. N. contacts 7, 8 and 9 make. Contact 5 disconnects dial tone. Contact 8 makes to put ground on wiper PW. The first digit selects the proper bank level for the brushes 101—106. To take the proper series of steps after the first step, the vertical magnet 13 is pulsed in the following manner: ground, armature 12, contact 43, IW, contacts 51, contacts 9, contacts 62, relay 60, vertical magnet 13 and battery. Slow-to-release relay 60 remains operated until the first series of pulses are completed.

The second digit is dialed to select the proper terminals on the bank level selected, and again another series of pulses are emitted from substation 2. Before the second series of pulses commence, relay 60 is released to prepare the pulsing circuit to the rotary magnet 14 and series relay 80. Relay 10 is interrupted in accordance to the pulses emitted in a manner previously described. The rotary magnet 14 is energized over the following path to step the brushes 101—106 on the first rotary step: battery, rotary magnet 14, contact 93, contact 75, contact 63, contacts 9, contact 51, wiper IW, contact 43, armature 12 and ground. In multiple with the rotary magnet is relay 80. When the rotary magnet 14 is stepped by the first pulse, relay 80 is operated in the following manner: battery, relay 80, contact 75, contact 63, contacts 9, contact 51, wiper IW, contact 43, armature 12 and ground. The remaining pulses of the second digit pulse the rotary magnet in the following manner: battery, rotary magnet 14, contact 93, contact 86, contact 63, contacts 9, contact 51, wiper IW, contact 43, armature 12 and ground. Slow-to-release relay 80 remains energized during the second series of pulses. Relay 80 operates and contact 84 makes to energize relay 70 over the following path: battery, relay 70, contact 95, contact 84 and ground. Relay 70 operates to open contact 75 to open the operating circuit to the rotary magnet 14. The locking circuit is completed for relay 70 over the following path: ground, contact 184, conductor 15, contact 73, relay 70 and battery. When relay 70 operates contact 74 prepares an operating circuit for relay 90 and at contact 71 prepares an operating circuit for code relay 110. When relay 80 releases, relay 90 is operated over the following path: battery, relay 90, contact 95, contact 74, conductor 15, contact 184 and ground. Therefore, after the second digit the circuit to the rotary magnet 14 is further opened at contact 93. After the second digit is dialed, relay 90 is operated and the circuit is completed to operate the motor magnet 120 to step the minor switch 108 for the digits following the second digit.

The subscriber at the telephone substation 2 has completed dialing his first two digits. Let us assume for the present discussion that he has dialed digits "35." In so doing, the code selector raises its brushes 101—106 to the third level in response to the first digit "3" and then rotates the brushes 101—106 to the terminal five in response to the second digit "5" in the manner previously described. The code wiring designated 107 is connected from the bank terminals to a group of 60 condensers designated A1—A0, B1—B0, etc. The condensers engaged by brushes 101—106 are charged in the following manner: battery, through back contacts of relay 110, such as armatures 111—116, the respective wipers 101—106, bank contacts engaged by said wipers, one side of each condenser, other side of condenser common conductor 128, armature 117 and ground. Let us assume that the code selected is 142852. Therefore, brush 101 is connected to condenser A1; brush 102 is connected to condenser B4; brush 103 is connected to condenser C2; brush 104 is connected to condenser D8; brush 105 is connected to condenser E5, and brush 106 is connected to condenser F2.

At the completion of the second digit dialed and after the slow-to-release relay 80 releases, but before relay 90 operates, the path is completed to operate the code relay 110 in the following manner: battery, relay 110, conductor 19, contact 71, contact 81 and contact 91 to ground.

When relay 90 operates, the circuit is opened to rotary magnet 14 by breaking contact 93; ground is taken off the code relay 110 by breaking contact 91; and contact 94 prepares a circuit to energize the motor magnet 120.

When code relay 110 operates, the charges on the selected condensers A1, B4, C2, D8, E5 and F2 are discharged into the first 6 register condensers 109 through make contacts of armatures 111—117. Also, when code relay 110 operated, armature 118 completed a circuit to energize the stepping magnet 200 for the wipers 121 and 122 in the following manner: battery, armature 118, contact 129 and stepping magnet 200 to ground. Relay 110 releases as soon as relay 90 operates contact 91. Relay 110 releases and deenergizes magnet 200. Rotary switch wipers 121 and 122 step upon deenergization of magnet 200.

Contact 129, an automatic stop contact, will remain closed as long as rotary switch wipers 121 and 127 are in step with one another or as long as rotary switch wiper 127 is ahead of rotary switch wiper 121 in regard to their respective terminal positions. After rotary switch 127 takes its first step contacts 119 and 144 of the normalizing cam 145 will make. After rotary switch wipers 121 and 122 take their first step, contacts 137 and 138 of normalizing cam 136 will make. The cam contacts 119 and 144 will remain operated until wiper 127 again reaches the home position, which is the eighth contact, and likewise cam contacts 137 and 138 will remain operated until wipers 121 and 122 again reach their home position, which is the first contact.

The operation of the register condensers 109 discharging in association with the electronic circuits T1, T2, T3 and T4 to send out pulses to an automatic telephone exchange, or a like, by way of contact 135, is explained in detail in a similar circuit shown in Patent 2,463,708, issued March 8, 1949. For purposes of clarity, the operation is repeated. While wiper 121 remained on the first contact it connected negative battery to the grid to tube T3. The cathode and screen grid of tube T3 are connected to a tap on a voltage divider connected across the battery. This tap is adjusted so that the negative bias applied to the grid of tube T3 is slightly less than that required to prevent the tube from firing. Thus tube T3 is normally fired causing the relay 190 connected in its anode circuit to be normally operated. Relay 190 in turn maintains a slow-to-release relay 210 normally operated. When magnet 200 was operated it opened the anode circuit of tube T3 at contacts 201 causing the tube to be extinguished and relay 190 to be released. When the magnet 200 restored it advanced wiper 121 to the second contact thus connecting the first register condenser of register condensers 109 to the grid of tube T3 and the charge on this condenser prevents the tube from firing again when contacts 201 reclose. The first register condenser of the register condensers 109 is the condenser shown to the left of the group in Fig. 2. When wiper 121 is advanced to the second contact it also connects condenser 123 in multiple with the first register condenser. The charge stored in the first register condenser is then redistributed between the first register condensers and condenser 123 in proportion to their capacities. This redistributed charge is always high enough to prevent the firing of tube T3. Relay 190 opened the circuit to relay 210 which restores after a brief delay and closes a circuit to the impulse generator at contacts 211. This impulse generator is described in detail in Patent No. 2,458,283, issued January 4, 1949, to the present inventor. It will therefore be only briefly described here. The restoration of relays 190 and 210 connects ground to the anodes of tubes T1 and T2 through contacts 201, 192 and 211. Tube T1 fires and operates relay 130. Relay 130 operates and transfers negative battery from the grid of tube T2 to the grid of tube T1 at contacts 133. After a time interval determined by the time constant of the resistance and capacitance in the grid of tube T2 the potential on the grid of T2 falls to a point where tube T2 fires. The firing of grid T2 extinguishes tube T1 due to the capacitative coupling between the anodes of the two tubes and thus causes the release of relay 130. Relay 130 restores and transfers negative battery back to the grid of T2 at contacts 133. After a further time interval determined by the time constant of the resistance and capacitance in the grid circuit of tube T1 the potential on the grid of tube T1 falls to a point where tube T1 again fires. This cycle of operations continues as long as ground is connected to the anodes of the tubes. The speed of operation is controlled by adjustment of the voltage divider having its tap connected to the cathodes of tubes T1 and T2, and the ratio of the operated to the released intervals of relay 130 is controlled by adjustment of the slider on the potentiometer connected between the grids of the tubes.

Each time that relay 130 operates it disconnects condenser 123 from the first register condenser 109 and connects it to ground at contacts 132 causing condenser 123 to be discharged and charged in the reverse direction to the potential of the battery. Relay 130 also opens the impulsing circuit, which is connected to automatic telephone switching apparatus at contacts 135. The pulsing out circuit at contact 135 operates the line relay of the first office selector over the following path: ground, relay LR, contacts 29, contacts 44, wiper L1, conductor 17, contacts 135, conductor 18, wiper L2, contacts 45, contacts 29', relay LR and battery. The operation of relay LR will effectuate the connections to the subsequent switches of the telephone system. Each time that relay 130 restores it recloses the impulsing circuit at contacts 135 and reconnects condenser 123 in multiple with the first register condenser 109. Condenser 123 then discharges and recharges in the reverse direction to an extent depending on the remaining charge on the first register condenser 109. The values of the condensers are so chosen that when relay 130 restores, the remaining charge on first register condenser is reduced to a point where tube T3 is enabled to fire and operate relay 190. Relay 190 operates, opens the circuit to the impulse generator at contacts 192 to stop further transmission of impulses, closes the anode circuit of tube T4 at contacts 191, and closes the circuit to relay 210 and removes negative battery from the grid of tube T4 at contacts 193. Relay 210 operates and opens further points in the impulse generator circuit and the grid circuit of tube T4 at contacts 211 and 212, respectively. Before the wiper 122 left the first contact it connected negative battery to the grid of tube T4 which prevented it from firing. When the wiper 122 was advanced to the second contact, negative battery was connected to the grid of T4 through contacts 194 and 212. When this latter source of negative battery is opened after the transmission of the first series of impulses the condenser connected between the grid and cathode of T4 discharges through the adjustable resistor connected across it. After a time interval determined by the adjustment of this resistor, the grid potential of tube T4 reaches the critical value where the tube fires and operates relay 170. Relay 170 operates and closes a circuit to magnet 200 at contacts 171. Magnet 200 operates and opens the anode circuit of tube T3 at contacts 201. Tube T3 is thus extinguished and relay 190 released. Relay 190 restores and opens the anode circuit of tube T4 at contacts 191 causing tube T4 to be extinguished and relay 170 released. Relay 170 restores and opens the circuit to magnet 200 which restores and advances the wipers 121 and 122 to the third step. When contacts 201 reclose, tube T3 will be prevented from striking by the potential applied to its grid by the second register condenser 109. Relay 190 therefore remains released and when relay 210 subsequently restores, the circuit to the impulse generator is again closed and negative battery is reconnected to the grid of T4 to charge the condenser in its grid circuit preparatory to measuring the next spacing interval. When wiper 122 was advanced to the third contact, it short-circuited the first register condenser 109 to remove any residual charge which may have been left on the condenser. Nine more series of impulses are now counted out in the same manner as the first except that the initial charges on register condensers 109 determine how many operations of relay 130 are required in each series to reduce the charge in the register condenser corresponding to that series to the point where tube T3 is enabled to fire.

In the interim the subscriber at substation telephone 2 has dialed the last four digits of the called subscriber's number. Relay 90 remained operated, and the third digit dialed operates the motor magnet 120 over the following path: ground, armature 12, contact 43, wiper W1, contact 51, contact 9, contact 63, contact 94, conductor 16 and motor magnet 120 to battery. Minor switch 100 steps to a terminal in accordance to the number of pulses sent out by the third digit dialed. After the first step of the minor switch 108, off-normal contact 146 is made. Thus, slow-to-release relay 280 becomes operated over the following path: ground, relay 280, off-normal contact 146, contact 147 and battery. Relay 280 is operated when motor magnet 120 is energized. Contact 281 is connected to battery to operate relay 270.

When wiper 108 comes to rest on the selected terminal after the dialing period, the selected condenser becomes charged over the following path: ground, armature 143, wiper 108, selected condenser of group of condensers 124, armature 141 and normal contact to battery. Relay 280 releases after an interval since the motor magnet has de-energized and opened the contact 147 which completed the path for operating relay 280. When relay 280 has released, contact 282 closes. Relay 270 remains operated long enough to operate relay 140 over the following path: ground, relay 140, contact 271, contact 282, contact 139 and battery. Relay 140 operates disconnecting battery at break contact of armature 141 and connecting battery at the make contact of armature 143. The path is now completed for discharging the charge on the selected condenser of group of condensers 124 to the seventh register condenser of condensers 109 in the following manner: battery, armature 143, wiper 108, selected condenser 124, make contact of armature 141, wiper 127, seventh register condenser of condensers 109 and battery.

Operation of relay 140 completes the circuit to operate slow-to-release relay 150 over the following path: battery, relay 150, make contact of armature 142 and ground. Relay 150 operates and contact 151 makes. Relay 270 releases shortly after relay 280 released to open the circuit to relay 140 subsequent to the operation of relay 150. Relay 140 now releases. A circuit is now completed to operate release magnet 125 in the following manner: ground, break contact of armature 142, contact 151, magnet 125 and battery. In multiple with magnet 125 is relay 160. Relay 160 operates simultaneously with release 125 in the following manner: battery, relay 160, contact 151, break contact of armature 142 and ground.

The operation of release magnet 125 restores the wiper 108 to the first terminal to await operation for the next series of pulses and opens off-normal contacts 146. Operation of relay 160 completes the circuit to magnet 126 for stepping wiper 127 upon deenergization in the following manner: ground, magnet 126, contact 162 and battery. Relay 150 releases and subsequently relay 160 releases to restore magnet 126 to step wiper 127. The wiper 127 is now on the next terminal and the charge on the seventh register condenser subsequently controls the sending out of pulses in association with the electronic circuits T1, T2, T3 and T4 through contact 135 in a manner previously described in detail.

When tube T4 and relay 170 operate, contact 171 completes the circuit to motor magnet 200 to step the wipers 121 and 122 to the next terminals. However, wipers 121 and 122 will not step until wiper 127 is either in synchronism with wipers 121 and 122 or are a contact ahead in direction of movement. If the wipers 121, 122 and 127 are in this condition, contact 129 is opened and thereby opens the circuit to magnet 200. Therefore, motor magnet 200 does not operate unless wiper 127 is either ahead of wipers 121 and 122 or in step with wipers 121 and 122. This insures that the register condensers are charged before they are connected to the electronic circuits.

The system is now prepared to receive the fourth dialed digit and the operation repeats itself for the fourth, fifth and sixth dialed digits. The manner of operation is similar to that described for the third digit.

At the completion of the transmitting of the series of impulses to the first office selector, wiper 122 reaches contact 13, the director release relay 180 is operated over the following path: battery on wiper 122, contact 13, relay 180 to ground. When wipers 121 and 122 stepped off contact 1 the off-normal contacts 138 and 137 made. Likewise, when wiper 127 stepped off contact 8, off-normal contacts 119 and 144 made. Relay 180 operates and closes contacts 181, 182 and 183. Closing of contact 182 completes the locking circuit for relay 180 over the following path: ground, relay 180, contact 182 and battery from both contacts 137 and 138 and contacts 119 and 114. Contact 181 closes to complete the path to operate stepping magnet 126 in the following manner: battery, contact 119, contact 181, self-interrupter contact, stepping magnet 126 and ground. Therefore, stepping magnet 126 will operate until the wiper 127 rests on the contact 8. The normalizing cam is arranged so that when wiper 127 is restored to the contact 8, the cam engages a contact so as to open contacts 119 and 144. Contact 183 closes to complete a path to operate the stepping magnet 200 in the following manner: ground, stepping magnet 200, contact 129, self interrupter contact, contact 183, contact 137 and battery. Wipers 121 and 122 step upon deenergization of magnet 200 and the step is thereupon effected when stepping magnet 200 operates to open the self interrupter contact included in its circuit. Stepping magnet 200 steps wipers 121 and 122 until the wipers rest on contact 1, thereupon normalizing cam 136 will engage a contact to open contacts 138 and 137. When contacts 137 and 119 open, the locking circuit of relay 180 is opened over a path previously described to release relay 180.

When release relay 180 operated, ground was removed at contact 184 to thereby open the locking circuit of relay 70. Therefore, relay 70 releases and contact 74 opens to release relay 90. Relay 90 is slow-to-release and therefore the selector release magnet RLSE is operated over the following path: battery, contact 92, contact 82, contact 72, contact 61, release magnet RLSE, contact 7, contact 8 and ground. The brushes 101-106 are now released and restored to their normal position. Therefore, O. N. contacts 5 and 6 make, while O. N. contacts 7, 8 and 9 break. Contact 52 makes to operate relay 20 over the following path: battery, relay 20, contact 12, contact 43, wiper IW, contact 52 and ground. Contacts 21 and 23 break to release relay 10. Contacts 22 and 24 make to extend the line of the calling subscriber to the train of operated switches. Relay 20 is held operated through contacts 28 from ground extending back over the holding conductor HC from the automatic switch train. Armature 11 falls back to release relay 30 and contact 33 breaks the circuit to release relay 40. Ground at contact 41 is disconnected from wiper PW to remove the busy condition. Release magnet releases, the code selector wipers restore and open the off-normal contacts 7 and 8.

The holding ground on conductor HC also guards the director selector against seizure by other line switches. The talking connection from the calling subscriber extends over the heavy talking conductors, contacts 22 and 24 to the first office selector and succeeding switches to the called line. The code selector in the lower portion of Fig. 1 and the director sender are released and prepared for further use on other calls. After conversation and responsive to the subscriber's hanging up, ground is removed from holding conductor HC to release the calling line switch and relay 20.

*An office code with less than six digits*

The subscriber at the telephone substation 2 has completed dialing his first two digits, and the system operates in the same manner as was previously described. Let us assume for the present discussion that the subscriber has dialed "31." In so doing, the code selector 1 raises its brushes 101—106 to the third level in response to the digit "3" and then rotates the brushes 101—106 to the terminal 1 in response to the second digit "1" in the manner previously described.

In the instances when the office code designated is less than six digits, the number of condensers of the groups A1—A0, B1—B0, C1—C0, etc. that are connected to the bank contacts by means of the code wiring 107 will equal the number of digits in the selected code. Let us assume, at this point, that the code selected is 142. The bank contacts connected to condensers A1—A0, B1—B0, C1—C0, D1—D0 and F1—F0 will depend upon the code wiring 107 connections. The limitations heretofore explained in condenser connections are applicable. Under the present code an arrangement may be as follows: condenser A1 is wired by code wiring 107 to the bank contacts 31 accessible to brush 101; bank contacts 31 accessible to brush 102 is not connected to any condenser to provide a "skip" position; condenser C4 is wired to the bank contact 31 accessible to brush 103; condenser D2 is wired to the bank contact 31 accessible to brush 104. The bank contacts 31 accessible to brushes 105 and 106 are not wired to any condenser and also provide other "skip" positions. Any arrangement described may be used. Instead of using condensers A1, C4 and D2, condensers B1, E4 and F2 can be used for the same code. The arrangement will depend entirely upon the code wiring selected, and any number of "skip" positions may be provided. The condensers engaged by brushes 101—103 and 104 are charged in the same manner as was previously described.

At the completion of the second digit dialed and after the slow-to-release relay 80 releases, but before relay 90 operates, the path is completed to operate the code relay 110 in a manner previously described. When code relay 110 operates, the charges on the selected condensers A1, C4 and D2 are discharged into the first, third and fourth register condensers 109 through the make contacts of armatures 111, 113 and 114. Also when code relay 110 operated, armature 118 completed the circuit to energize the stepping magnet 200 to step the wipers 121 and 122 in the manner previously described. Relay 110 releases as soon as relay 90 operates contact 91. Relay 110 now releases and deenergizes magnet 200. Rotary switch wipers 121 and 122 step upon deenergization of magnet 200.

The operation of the first register condenser 109 discharging in association with the electronic circuit T1, T2, T3 and T4 to send out pulses from contact 135 to an automatic telephone exchange is the same as was previously described in connection with the six digit office code. However, when brush 102 engaged its respective bank contact there was no charged condenser connected thereto. Therefore, when relay 110 operated no charge was placed in the second register condenser of the register condensers 109. After the outgoing pulses were transmitted from contact 135 for the first digit of the office code, stepping magnet 200 released and the wipers 121 and 122 stepped to the third contact. Wiper 121 upon engaging the third contact does not encounter any potential, since no charge was registered on the second condenser of the registered condenser 109. Therefore, tube T3 fires, since there is no potential on the grid to bias the tube T2 beyond its cut-off potential. With tube T3 firing, relay 190 is operated, and contact 193 completes the circuit to operate relay 210. Relay 190 operates to open the circuit to the impulse generator at contacts 192 to prevent any transmission of impulses, closes the anode circuit of tube T4 at contacts 191 and removes negative battery from the grid of tube T4 at contacts 193. Relay 210 operates and opens further points in the impulse generator circuit and the grid circuit of tube T4 at contacts 211 and 212, respectively. Before the wiper 122 was advanced from the second contact, negative battery was connected to the grid of tube T4 through contacts 194 and 212 when relays 190 and 210 released. When this latter source of negative battery is opened, after relays 190 and 210 are operated again, the condenser connected between the grid cathode circuits of the tube T4 discharges through the adjustable resistor connected across it. After a time interval determined by the adjustment of this resistor, the grid potential of tube T4 reaches the critical value where the tube fires and operates relay 170. Relay 170 operates and closes a circuit to magnet 200 at contacts 171. Magnet 200 operates and opens the anode circuit of tube T3 at contacts 201. Tube T3 is thus extinguished and relay 190 released. Relay 190 restores and opens the anode circuit of tube T4 at contacts 191 causing tube T4 to be extinguished and relay 170 released. Relay 170 restores and opens the circuit to magnet 200 which restores and advances the wipers 121 and 122 to the next step.

The operation for the system when the wiper 121 engages the fourth and fifth contacts is similar to that previously described for the operation in a six digit office code. The operation for the system when the wiper 121 engages the sixth and seventh contacts are similar to that previously described for the operation in relation to the wiper 121 engaging the third contact.

From this point the operation of the last four digits dialed by the substation operating the minor switch 108 and the retransmission thereof is the same as was previously described for a six digit office code.

While the invention has been described with a certain degree of particularity, it should be apparent that numerous modifications may be resorted to without departing from the spirit and scope of the inventions as defined in the appended claims.

What is claimed is:

1. In a telephone system, a subscriber's line, a single-digit register switch, means for transmitting impulses over said line to said switch, means for connecting said line with said switch, said impulses corresponding to a portion of the digits included in the call number of a called subscriber's line, means controlled responsive to said impulses transmitted over said line to said switch for operating and restoring said switch once for each digit in said portion of said called number, a set of digit condensers connected to said switch, circuit means for selecting and charging one of said digit condensers corresponding to the transmitted digit in response to each operation of said switch, a set of storage condensers, means for transferring the charge on each said selected digit condenser to successive ones of said storage condensers, an electronic counting device, means for successively connecting said device to successive ones of said storage condensers, circuit means for variably operating said device in accordance with the charges on said connected storage condensers, and an impulse relay operated in response to the operation of said device for transmitting digits corresponding to the charges on said connected storage condensers.

2. In a telephone system wherein call numbers individual to each subscriber's line include office digits designating the office terminating such lines and numerical digits designating such lines in said designated office, a calling subscriber's line, a single-digit register switch, means for connecting said calling line with said switch, means for transmitting impulses corresponding to the numerical digits of a called number over said calling line to said switch, means responsive to said impulses transmitted over said calling line for operating and restoring said switch once for each digit in the numerical portion of the called number, registering means for registering each transmitted digit in said numerical portion in response to each switch operation, storing means, means for transferring each registered digit from said registering means to said storage means after each operation of said switch to successively store said registered digits in said storage means, an impulse sender, means for connecting said sender with said storage means, and means for operating said sender in response to connecting said sender to said storage means to transmit impulses corresponding to the digits stored in said storage means.

3. In a telephone system, a subscriber's line, a code selector switch having a directed movement, means for connecting said line with said switch, a plurality of sets of bank contacts for said switch, means for transmitting impulses over said line to said switch, means responsive to said impulses for variably operating said switch to select one of said sets of bank contacts, a plurality of condensers having capacitances commensurate with different digit values, code wiring connections variably connecting said condensers to said sets of bank contacts, means including said code wiring connections for charging selected ones of said condensers connected to said one selected set of bank contacts in response to said switch operation, a set of storage condensers, means for transferring the charge on each of said selected condensers to a different one of said storage condensers, an electronic counting device including a plurality of tubes and a pulsing relay, switching means for successively connecting said storage condensers to said counting device, the charge on said successively connected storage condensers controlling the tubes and pulsing relay of said device to transmit a series of impulses for each charged storage condenser, and means controlled by said counting device for operating said switching means after each series transmission.

4. In a telephone system, a subscriber's line, a code selector switch having a plurality of separate directed movements, an automatic switch for connecting said code selector switch with said line, a plurality of sets of bank contacts for said code selector switch, means for transmitting impulses over said line to said code selector switch, means responsive to said impulses for variably operating said code selector switch to select one of said sets of bank contacts, a plurality of condensers having capacitances commensurate with different digit values, code wiring connections variably connecting said condensers to said sets of bank contacts, means including said code wiring connections for charging certain ones of said condensers connected to said one selected set of bank contacts in response to said code selector switch operation, and means including an electronic impulse sender controlled by said charged condensers for transmitting a plurality of series of impulses.

5. In a telephone system as claimed in claim 4 wherein the number of series of impulses transmitted by said sender depends upon the number of condensers that were charged by said code selector switch operation.

6. In a telephone system as claimed in claim 4 wherein each of said series of impulses transmitted by said sender corresponds to a digit having a value corresponding to one of said charged condensers.

7. In a telephone system as claimed in claim 4 wherein said last means includes storage condensers, means for transferring the charge on said certain first condensers to said storage condensers, and switching means for successively associating said storage condensers with said sender to control the impulse transmission of said sender.

8. In a telephone system, a subscriber's line, a code selector switch having a plurality of separate directed movements, an automatic switch for connecting said line with said code selector switch in response to the initiation of a call on said line, means for transmitting impulses from said line to said code selector switch, means responsive to said impulses for variably positioning said code selector switch, a plurality of condensers having capacitances commensurate with different digit values, means including code wiring connections extending between said code selector switch and said condensers for charging a predetermined number of said condensers dependent upon the position taken by said code selector switch, and means including an electronic sender controlled by said charged condenser for transmitting a plurality of series of impulses corresponding to the digit values of said charged condensers.

9. In a telephone system as claimed in claim 8 wherein the number of condensers charged by the positioning of said code selector switch varies dependent upon said code wiring connections to said switch, and the number of series of impulses transmitted by said sender varies dependent upon the number of condensers that are charged by the positioning of said code selector switch.

10. In a telephone system employing register senders including an office code selecting switch and a single-digit register switch and sending mechanism for successively transmitting digit impulse series, means in said register sender for operating said office code selecting switch to a particular position corresponding to the office digits in the office portion of a complete dialled telephone number, means in said register sender for operating and restoring said single-digit register for each digit dialled in the remaining portion of said complete telephone number, means including code wiring connections connected to said office code selecting switch for registering and translating said dialled office digits in accordance with said operated position of said office code selecting switch into coded office digits, means for successively registering each digit dialled in said remaining portion of said complete telephone number in response to each operation of said single-digit register switch, means for storing said coded office digits and for storing said successively registered digits, a sending mechanism in said register sender, means in said register sender for successively connecting said sending mechanism to successive ones of said stored coded office digits and thereafter to successive ones of said stored register digits, means for operating said sending mechanism, and an impulsing relay operated by said sending mechanism in accordance with said successive connections to transmit impulses corresponding to said stored office digits and said stored registered digits.

11. In a telephone system in which directory telephone numbers are composed of office-designating digits and line-designating digits, a code selecting switch, means in said switch responsive to the receipt of the designated office digits of a called directory telephone number for operating said switch to a corresponding predetermined position, translating means connected to said switch and operated to register a variable number of coded office digits dependent upon the operated position of said switch, a plurality of storage condensers corresponding in number to the ultimate number of coded office digits required in extending any desired telephone connection and arranged in successive order, means inclding said translating means for charging certain of said storage condensers in accordance with said registered coded office digits and for skipping the charging of other of said storage condensers in case less than said ultimate number of coded office digits are registered, an electronic impulse sender, stepping means for successively connecting said sender to successive ones of said storage condensers, electronic and relay means in said sender controlled by the charge on the storage condenser connected to said sender for transmitting a digit of the office code corresponding to the charge registration thereon and for thereafter controlling said stepping means to connect said sender to the next storage condenser, and for controlling said stepping means to connect said sender to a succeeding storage condenser when the sender is connected to a noncharged storage condenser without transmitting a digit.

12. In a telephone system employing register senders including an office code selecting switch and a single-digit register switch, means in said register sender for operating said office code selecting switch to a particular position corresponding to the office digits in the office portion of a complete dialled telephone number, means in said register sender for operating and restoring said single-digit register switch for each digit dialled in the remaining portion of said complete telephone number, means including code wiring connections connected to said office code selecting switch for registering and translating said dialled office digits in accordance with the said operated position of said office code selecting switch into coded office digits, means for successively registering each digit dialled in said remaining portion of said complete telephone number in response to each of said operations of said single-digit register switch, means for storing said coded office digits and for storing said successively registered digits, a sending mechanism in said register sender, means in said register sender for successively connecting said sending mechanism to successive ones of said stored coded office digits and thereafter to successive ones of said stored registered digits, means for operating said sending mechanism in accordance with said stored office and registered digits, and an impulse transmitting relay operated by said sending mechanism to transmit impulses corresponding to said stored coded office digits and said stored registered digits.

13. In a telephone system in which directory telephone numbers are composed of office-designating digits and line-designating digits, a code selecting switch, a plurality of sets of bank contacts in said switch, a corresponding plurality of wipers in said switch and each wiper being individual to a different one of said sets of bank contacts, a corresponding plurality of sets of digit condensers and each set of digit condensers being individual to a different one of said sets of bank contacts and its individual wiper, coded wiring connections connecting each set of digit condensers to predetermined bank contacts in its individual set of bank contacts while other bank contacts are not connnected to any condensers in accordance with predetermined office codes, means in said code selecting switch responsive to the receipt of the office digits of a called directory telephone number for operating said plurality of wipers to stop in engagement with a bank contact in each of said sets of bank contacts, circuit means including said wipers and said coded wiring connections for charging certain of said digit condensers in response to said switch operation, a storage condenser individual to each set of digit condensers and its individual wiper, other circuit means including said wipers and said coded wiring connections for transferring the charge on each of said digit condensers connected to said bank contacts engaged by said wipers to their corresponding individual storage condensers to store the selected office code whereby only certain ones of said storage condensers are charged in case only certain ones of said wipers engaged bank contacts having code wiring connections extending to said digit condensers while the remaining ones of said wipers engage bank contacts having no code wiring connections extending to said digit condensers, an electronic impulse sender, stepping means for successively connecting said sender to successive ones of said storage condensers, means for initiating the operation of said stepping means to connect said sender to the first of said storage condensers, electronic and relay means in said sender for transmitting a digit of the office code corresponding to the charge on each said connected storage condenser and for thereafter controlling said stepping means to connect said sender to the next storage condenser, and said electronic and relay means being ineffective to transmit a digit but effective to control said stepping means to connect said sender to a succeeding storage condenser in case said next storage condenser is without charge.

14. In an electronic director responsive to a plurality of series of pulses, a code selector switch, a first plurality of condensers accessible to said code selector switch, each of said first condensers having a capacitance commensurate with a different digit value, said code selector switch operative responsive to certain of said received series of pulses to select certain of said first condensers, means including a source of potential for charging said first selected condensers to a degree commensurate with a digit value, a second switch operated responsive to others of said series of pulses, a second plurality of condensers selected successively in response to said operation of said second switch, means including a source of potential for charging said second selected condenser to a degree commensurate with a digit value, a plurality of register condensers each having equal capacitance, means for transferring the charge on said first selected condensers to certain of said register condensers, means for transferring the charge on said second selected condensers to the others of said register condensers, a third switch associated with said register condensers, an electronic circuit connected to said third switch, means for operating said third switch to transfer the charge from said charged register condensers to said electronic circuit in succession, and means controlled by the charge on said register condensers for operating said electronic circuit to produce corresponding series of pulses.

15. An electronic director as claimed in claim 14 including a mechanical means to provide that said third switch can transfer the charge from other of said register condensers to said electronic circuit only after said second switch has transferred the charge from said first condensers to said register condensers.

16. An electronic director as claimed in claim 14 including a relay and said relay being operative in response to operation of said electronic circuit, and a stepping circuit responsive to the operation of said relay to step said third switch responsive to the completion of each series of pulses.

17. An electronic director as claimed in claim 16 including a wiper on said third switch operative in response to operation of said stepping circuit for removing any residual charge remaining in said register condensers after the charge from said register condensers has been transferred by said third switch.

18. In an electronic director responsive to a plurality of series of pulses, a code selector responsive to certain of said series of pulses, a first group of condensers each of said condensers having a different capacitance commensurate with a digit value, means including a source of potential for charging said condensers, means responsive to operation of said code selector for selecting and charging certain of said condensers in code, a plurality of register condensers each of said condensers having an equal capacitance, means including a code relay for transferring the charge on said first condensers to certain of said register condensers, a minor switch operative in response to certain other series of pulses, a second group of condensers each of said second condensers having a different capacitance commensurate with a digit value and said second condensers selectively charged in response to operation of said minor switch, means including a source of potential to charge said second condensers in response to operation of said minor switch, a switch and circuit means responsive to operation of said minor switch for successively transferring the charges on said selected second condensers to other of said register condensers, and means controlled by the charge on said register condensers to produce a corresponding series of pulses.

19. In an electronic director, a group of condensers each of said condensers having a capacitance commensurate with a digit value, means for selecting certain of said condensers in accordance with a code and charging said selected condensers in accordance with the digital value of said condensers, a group of register condensers and each of said register condensers having an equal capacitance; a relay and a circuit for transferring the charge on the selected charged condensers into certain of said register condensers to provide in accordance with the code selected, charged and non-charged register condensers; means for successively extending a connection from said register condensers, an impulse counting circuit connected to said last means operatively controlled by the charge on said register condensers, an impulse sender responsive to the operation of said counting circuit for transmitting pulses in accordance to the selected code, a stepping circuit controlled by the operation of said counting circuit to step said last means at the end of each series of pulses transmitted responsive to said last means encountering a charged register condenser, and a timing circuit responsive to said last means encountering a non-charged condenser for controlling said stepping circuit to step said switch another step without transmitting impulses.

20. In an electronic director, a code selector, a group of bank contacts, a plurality of brushes connected to said bank contacts in response to operation of said code selector, a plurality of condensers each of said condensers having a capacitance commensurate with a digit value, a code wiring connecting certain of said condensers to said bank contacts, means including a source of potential to charge certain of said condensers in accordance with the code selected responsive to selection by said brushes, a plurality of register condensers, a code relay and circuit responsive to operation of said code selector for transferring the charge on said certain selected condensers to certain of said register condensers, a switch including a wiper responsive to the operation of said relay and operative for extending connections from said register condensers, an impulse counting circuit connected to said switch and controlled by the charge on said register condensers, an impulse sender responsive to the operation of said counting circuit for transmitting pulses in accordance to the charge on said register condensers in the selected code, and a stepping circuit controlled by the operation of said counting circuit to step said switch at the end of each series of pulses transmitted responsive to said switch wiper encountering a charged register condenser and to step said switch after a short time interval without transmitting pulses responsive to said switch wiper encountering a register condenser without a charge.

21. In an automatic telephone system, a substation, a dialling means located within said substation for transmitting two groups of digital impulses, a code selector responsive to the dialling of one of said groups of digital impulses for selecting a code, a first means for connecting said code selector to said substation, a plurality of digital condensers each of said digital condensers having a different capacitance commensurate with a digit value, a source of potential for charging said condensers, a second means responsive to the operation of said code selector for selecting and charging certain of said digital condensers in code, a plurality of register condensers, means for transferring the charges on said selected digital condenser into certain of said register condensers, a second plurality of digital condensers each of said second condensers having a different capacitance commensurate with a digit value, a source of potential for charging said second digital condensers, a switching means responsive to the dialling of said other group of digital impulses for successively selecting and charging certain of said second digital condensers, means for transferring the charges on said selected second digital condensers into other of said register condensers, another switching means successively connected to said register condensers, an electronic counting circuit connected to said other switching means and operatively controlled by the charge on said register condensers, and means responsive to the operation of said counting circuit for sending out a corresponding series of pulses.

22. In an electronic director responsive to a plurality of received series of pulses, a code selector responsive to certain of said series of pulses for selecting a code, a plurality of brushes included within said code selector, a plurality of groups of bank contacts and each of said groups of bank contacts accessible to only one brush, a plurality of groups of condensers each condenser of each of said groups of condensers having a different capacitance commensurate with a digit value, means including a source of potential for charging said condensers, a code wiring connecting said condensers to said bank contacts in code so that each group of said condensers connected to only one group of bank contacts, said brushes operative in response to operation of said code selector for selecting and charging certain of said condensers in accordance to the code selected, a plurality of register condensers, a code relay responsive to the operation of said code selector for transferring the charge on said selected condensers to certain of said register condensers, a second group of condensers and each of said second condensers having a different capacitance commensurate with a digit value, means including a source of potential for charging said second condensers, a switch responsive to the other of said series of received pulses for successively selecting and charging certain of said second condensers, means responsive to the operation of said switch for successively transferring the charge on certain of said second condensers to other of said register condensers, means controlled by the charge on each of said register condensers for transmitting a corresponding series of pulses.

23. In an automatic telephone system, a substation, a dialling means located within said substation for dialling two groups of digital impulses, a director selector, a first means interconnecting said substation and said director selector, a code selector responsive to the operation of said director selector in response to the dialling of one group of digital impulses for selecting a code, a plurality of brushes selectively operated in response to operation of said code selector, a plurality of groups of bank contacts and each of said groups of bank contacts individually accessible to one of said brushes, a plurality of groups of digital condensers, each condenser of each of said groups of condensers having a different capacitance commensurate with a digit value, means including a source of potential charging said condensers when connected to said brushes, a code wiring interconnecting said bank contacts and said condensers in code so that each group of said digital condensers is accessible to a different one of said brushes, a plurality of register condensers each of said register condensers having an equal capacitance, a code relay responsive to the operation of said code selector for transferring the charge on said digital condensers to certain of said register condensers, a second plurality of digital condensers each of said second digital condensers having a capacitance commensurate with a digit value, a source of potential for charging said second digital condensers, a minor switch operative in response to dialling of said other group of digital impulses from said substation for successively selecting and charging said second digital condensers, a circuit means including a switch operative in response to operation of said minor switch for successively transferring the charge on selected ones of said second digital condensers to other of said register condensers, an electronic counting circuit, another switching means operative for connecting said register condensers to said electronic counting circuit, said electronic counting circuit operatively controlled by the charge on said register condensers, and an impulse sender responsive to the operation of said counting circuit for producing a corresponding series of pulses.

HAROLD J. McCREARY.

REFERENCES CITED

The following references are of record in the file of this patent:

UNITED STATES PATENTS

| Number | Name | Date |
|---|---|---|
| 2,056,265 | Germanton | Oct. 6, 1936 |

FOREIGN PATENTS

| Number | Country | Date |
|---|---|---|
| 489,609 | Great Britain | July 25, 1938 |